US009674677B2

(12) United States Patent
Godavari et al.

(10) Patent No.: US 9,674,677 B2
(45) Date of Patent: Jun. 6, 2017

(54) MESSAGE ROUTING USING A HOME GATEWAY (75) Inventors: Srinivasu Godavari, Karnataka (IN); Sriganesh Madhvanath, Karnataka (IN); Geetha Manjunath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/406,850

(22) PCT Filed: Jul. 25, 2012

(86) PCT No.: PCT/IN2012/000518
§ 371 (c)(1),
(2), (4) Date: Dec. 10, 2014

(87) PCT Pub. No.: WO2014/016846
PCT Pub. Date: Jan. 30, 2014

(65) Prior Publication Data
US 2015/0172885 A1  Jun. 18, 2015

(51) Int. Cl.
H04W 4/00 (2009.01)
H04W 4/14 (2009.01)
H04W 4/12 (2009.01)
H04W 4/08 (2009.01)

(52) U.S. Cl.
CPC .............. *H04W 4/14* (2013.01); *H04W 4/08* (2013.01); *H04W 4/12* (2013.01)

(58) Field of Classification Search
CPC  H04W 4/14; H04W 4/08; H04W 4/12; H04L 49/90; H04L 65/1066; H04L 3/569
See application file for complete search history.

(56) References Cited

U.S. PATENT DOCUMENTS

| 2003/0027565 A1* | 2/2003 | Bossemeyer, Jr. .. H04L 12/6418 455/422.1 |
| 2007/0110076 A1* | 5/2007 | Brouwer ................. H04W 4/14 370/395.52 |
| 2008/0233983 A1* | 9/2008 | Park .................... H04L 12/2818 455/466 |
| 2009/0225760 A1* | 9/2009 | Foti ....................... H04L 67/142 370/400 |

(Continued)

FOREIGN PATENT DOCUMENTS

CN  101115524  1/2008

OTHER PUBLICATIONS

International Search Report and Written Opinion dated May 2, 2013, issued on PCT Patent Application No. PCT/IN2012/000518 filed on Jul. 25, 2012, The State Intellectual Property Office, the P.R. China.

(Continued)

*Primary Examiner* — Abdelnabi O Musa
(74) *Attorney, Agent, or Firm* — HP Patent Department (57) ABSTRACT Provided is a method of routing a message using a home gateway. A message is received at a message originating gateway, which identifies a home gateway of the sender of the message and routes the message thereto. A message communication preference of a receiver of the message is determined and the message is translated into the message communication preference of the receiver. The message is then routed to the receiver.

18 Claims, 4 Drawing Sheets

(56) References Cited

U.S. PATENT DOCUMENTS

2010/0142472 A1* 6/2010 Tarleton .............. H04L 12/5835
            370/329
2011/0142035 A1* 6/2011 Ku ...................... H04L 63/0853
            370/352
2011/0223945 A1* 9/2011 Bhatnagar ........... H04L 12/5855
            455/466
2011/0300833 A1* 12/2011 Shaw ................ H04M 3/53333
            455/413

OTHER PUBLICATIONS

Telecomindiaonline.com 2008. Synchronica Introduces Pre-RCS Unified Messaging with Mobile Gateway 6. http://telecomindiaonline.com/synchronica-introduces-pre-rcs-unified-messaging-with-mobile-gateway-6.ht.

* cited by examiner

MESSAGE ROUTING USING A HOME GATEWAY

CROSS-REFERENCE TO RELATED APPLICATION

This application is a national stage application under 35 U.S.C. §371 of PCT/IN2012/000518, filed Jul. 25, 2012.

BACKGROUND

People use a variety of devices and messaging options for communication depending on their needs and comfort level with technology. According to a study, more than fifty percent of the phones in the developing countries are low-feature set devices and many more are without Internet connectivity. This population with basic mobile phones only communicate by sending short text messages or via voice.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

There are a number of communication options available these days for people to exchange messages with each other. Some individuals use basic mobile phones to send SMS, while others use advanced devices with chat clients and email programs to stay in touch. Today, communication between two people requires both users to have access to clients that support the same protocol. For example, in order to reach a person through his chat client, one needs to use a chat client at the source as well. Additionally, since each communication format (email, SMS, chat, etc.) requires a unique user ID for exchange of messages, a user is burdened with the task of remembering (or storing) multiple user IDs for an acquaintance.

In another situation, a user may not be available (or have the option) to receive his/her messages on a particular communication format all the time. For instance, during travel a user may not have access to his/her emails. Or, even when access is available, the user may not prefer to receive his/her messages via emails since it may result in additional data charges. In both these situations, however, a user may be open to or prefer to receive his/her messages via SMS or an alternate messaging option.

Considering the above two concerns, there may be a scenario where a group of users (such as a family a group of friends, etc.) may like to send messages to each other without the inconvenience of remembering (or storing) multiple user IDs for all the members of the group and without worrying about whether a message has reached (or been read) by an intended receiver.

Proposed is a message routing solution using a private home gateway. The proposed approach enables a user to send a message to a member of a group (such as a family member) by simply using an alias name of the receiver. The sender of the message also need not remember multiple user IDs (such as email ID, chat ID, etc.) of the receiver. For example, a sender may use an alias name "Archie" (for the receiver "Archie Thomas") to send a message to him. The proposed solution also enables a receiver of a message to specify his/her preferred communication format for receiving a message. For instance, whether a user would like to receive his/her messages as emails, chat messages, SMS, etc. Apart from the message format, a receiver can also indicate his/her preferred device (such as, his/her mobile phone, tablet, desktop computer, etc.) for receiving messages. In an implementation, a user can indicate his/her preference by creating a profile and indicating the preferred communication format and device against his/her profile.

For the sake of clarity, the term "gateway" includes a computing device or computer program configured to perform the tasks of a gateway. In an example, the term "gateway" includes a message routing gateway that facilitates exchange of messages across different protocols.

Figure 1:
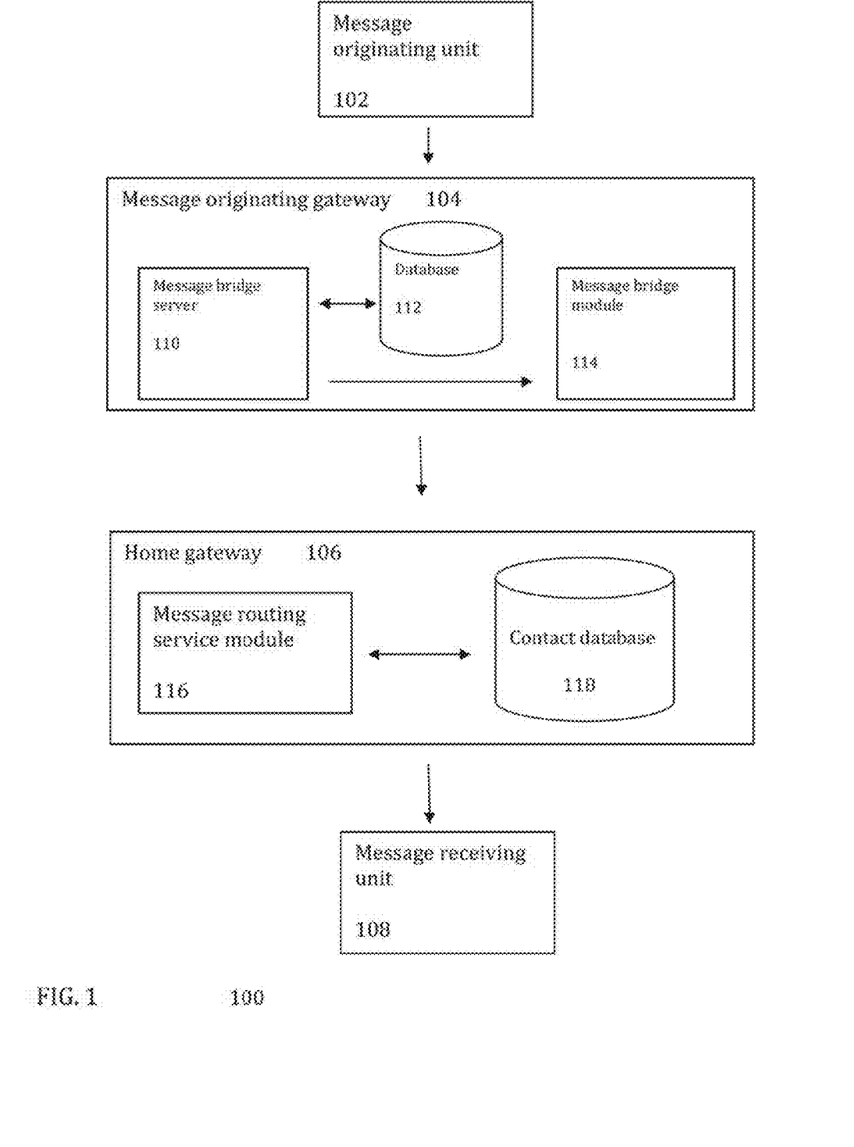
FIG. 1 shows a message routing system, according to an example.

FIG. 1 shows a message routing system 100, according to an example. Message routing system 100 includes message originating unit 102, message originating gateway 104, home gateway 106 and message receiving unit 108. In some examples, message routing system 100 may include additional message originating units, message receiving units, home gateways and message originating gateways than illustrated in FIG. 1. Message routing system 100 enables exchange of messages between message originating unit 102 and message receiving unit 108 through message originating gateway 104 and home gateway 106. Message originating unit 102 and message receiving unit 108 may be connected to message originating gateway 104 and home gateway 106 through wire or wireless communication links.

Message originating unit 102 is used for composing and sending a message. The message may be a text message, multimedia message, chat message, an email, or the like. Message originating unit 102 may be software (machine readable instructions), hardware and/or a combination thereof. For example, message originating unit 102 may be a chat client program, such as Gtalk, Yahoo messenger, Microsoft Office communicator, or the like. In another example, message originating unit 102 may be a desktop computer, notebook computer, tablet computer, computer server, mobile phone, personal digital assistant (PDA), or the like, with a message originating program for composing and sending a message. Message originating unit 102 is used for creating and sending a message to a receiver, who may receive it on message receiving unit 108. The message creation may involve activities such as composing, editing, inserting, copying, pasting, and the like actions that entail a message creation. In an instance, message originating unit 102 is used to compose a message which is addressed to an alias name of a receiver. For example, a sender may use an alias name "Archie" (for the receiver "Archie Thomas") to send a message to him. The aforesaid activities are mentioned by way of examples only and no limitation should be read into them.

Message originating gateway (or first message gateway) 104 is the initial gateway that receives a message sent from a message originating unit 102. Message originating gateway 104 may be a Short Message Service gateway (SMS gateway) or any other gateway that is capable of receiving a message. Message originating gateway 104 includes message bridge server 110, database 112 and message bridge 114. In an implementation, message originating gateway 104 is hosted in a cloud computing system.

Message bridge server 110 identifies a sender's home gateway ID. A senders home gateway is identified by retrieving the sender's personal ID information from the message sent by him/her to message originating gateway 104 and then correlating the retrieved information with the sender's home gateway ID information stored in database 112.

Database 112 maintains a record of the mapping between a sender's personal ID (identification) and the sender's home gateway ID. A sender's personal ID may include sender's phone number mobile number), email address, chat ID, and the like that provides a unique identification to an individual. Similarly, a sender's home gateway ID is a unique set of characters that identifies a home gateway device of the sender. Database 112 maintains a record of an association between a sender's personal ID and his/her home gateway ID. To provide an illustration, if a sender's email ID is abc@xyz.com and his/her home gateway device ID is "Praphul", then the mapping may be in the format— "abc@xyz.com=Praphul". In another illustration, the mapping may be between a senders mobile number (12345XXXX) and his/her home gateway device ID i.e. 12345XXXX=Praphul.

Maintaining a record of an association (mapping) between a sender's personal ID and his/her home gateway ID in database 112 aids in the identification of a sender's home gateway when a message originating gateway 104 receives a message from the sender for routing to his/her home gateway. For instance, if a sender sends a text message to a message originating gateway 104, the gateway can identify the sender's home gateway ID by retrieving the mobile number of the sender from the SMS message and then correlating it with the sender's home gateway ID saved in database 112.

The mapping between a sender's personal ID and the sender's home gateway ID can either be static (semi-permanent) done as a configuration of the home gateway device or based on context of the user. It can also be based on the date and time of the day. For example, a user may decide to have two gateway devices—one at home and another at work—and maintain contact information of friends/family in one gateway device and colleagues/partners in the other. Depending upon the time of day, the appropriate coupled gateway device is chosen for forwarding and message routing.

Once a sender's home gateway has been identified, message bridge 114 redirects the received message to the sender's home gateway 106.

Home gateway 106 is connected to message originating gateway 104 through wire or wireless communication links over a computer network (such, as the internet). In an example, home gateway 106 is a private gateway of a sender who may host the same in his/her home or office. Once message originating gateway 104 identifies the home gateway of a sender from its records, it forwards the message to the sender's home gateway 106. Home gateway 106 includes message routing service (MRS) module 116 and contact database 118.

Message routing service (MRS) module 116 extracts a receiver's details from a message received by home gateway 106. Receiver details may include a receiver's name, receiver's alias name (such as "Archie" for "Archie Thomas"), receiver's phone number, receiver's email ID, receiver's chat ID, and the like. For instance, if a sender has used an alias for a receiver (such as "Archie" for "Archie Thomas"), message routing service module 116 extracts the name "Archie" from the message. In another instance, if a receiver's phone number is present in the received message, message routing service (MRS) module 116 extracts the phone number of the receiver.

Message routing service (MRS) module 116 also obtains a receiver's message communication preference from contact database 118. Message communication preference of a receiver specifies a receiver's preferred message communication format (mode) and message communication device for receiving a message. Message communication format may include an email client (if the receiver would like to receive the message via an email), a chat client (if the receiver's message receipt preference is via a chat message), an SMS service (if the receiver would like to receive an SMS message on his/her phone), and the like.

Message communication preference may also include preferred message communication device of a receiver for receiving a message. A receiver may specify his/her preferred message communication format and communication device by creating and saving a personalized profile in the contact database 118.

Message routing service (MRS) module 116 also obtains corresponding receiver ID from contact database 118 once a receiver's message communication preference is known. For instance, if as receiver's preferred communication mode is email, message routing service (MRS) module 116 obtains the email ID of the receiver (for example: archie@xyz.com). In another instance, if a receiver prefers to receive his/her messages as chat messages, the chat ID of the receiver is obtained from contact database 118.

Once a receiver's message communication preference and his/her corresponding receiver ID are known, message routing service (MRS) module 116 converts a received message to the preferred message communication format (and/or device) of a receiver and sends it to a message receiving unit of the receiver.

Contact database 118 maintains records of message communication preferences of a receiver(s). As mentioned above, message communication preference specifies a receivers preferred communication format and/or communication device for receiving a message. Contact database 118 also maintains a record of a receiver's communication ID against receiver's communication preference. For instance, if a receiver's preferred communication mode is email, contact database would maintain a record of the email ID of the receiver. For example, "Archie=>email=>archie@xyz.com".

In an implementation, a sender may maintain separate home gateway devices for diverse sets of people (users), such as family, friends, colleagues, acquaintances, etc.

Message receiving unit 108 is used for receiving and displaying a message. Message receiving unit 108 may be software (machine readable instructions), hardware and/or a combination thereof. For example, message receiving unit 106 may be a chat client program, such as Gtalk, Yahoo messenger, Microsoft Office Communicator, or the like. In another example, message receiving unit 106 may be desktop computer, notebook computer, tablet computer, computer server, mobile phone, personal digital assistant (PDA), or the like, with a message receiving program for receiving and displaying a message. Message receiving unit 108 is used for receiving and displaying a message from a sender, who may have composed and sent the message from message originating unit 102. In addition to receiving and displaying to message, message receiving unit 108 may be used for creating a response message to a sender, which may involve activities such as composing, editing, inserting, copying, pasting, and the like actions that typically entail a message response creation. Message receiving unit 108 may also be used for forwarding a received message to another receiver. The aforesaid activities are mentioned by way of examples only and no limitation should be read into them.

Figure 2:
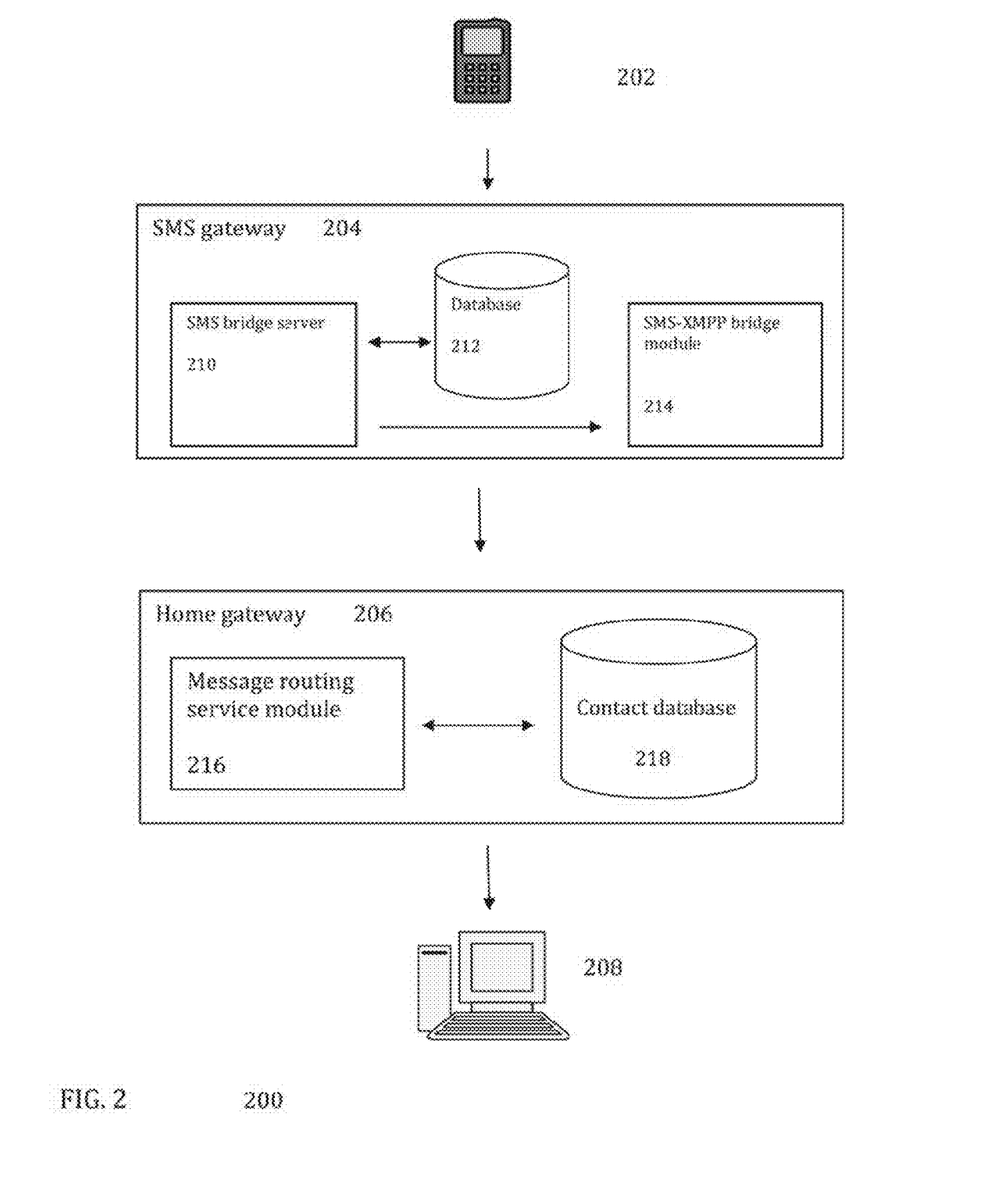
FIG. 2 shows a message routing system, according to an example.

FIG. 2 provides a specific example of a message routing system, according to an implementation. In the illustrated example, message routing system 200 comprises message originating unit 202, SMS gateway 204, home gateway 206 and message receiving unit 208.

In the present example, message originating unit 202 is a mobile phone, which is used by a sender to compose and send a text message (an SMS) to a receiver.

SMS gateway 204 is the first gateway that receives a message sent from a message originating unit 202. SMS gateway 204 includes SMS bridge server 210, database 212 and SMS-XMPP (Extensible Messaging and Presence Protocol) bridge module 214.

SMS bridge server 210 identifies the sender's home gateway ID by retrieving the sender's personal ID information from the SMS message sent by him/her and correlating the retrieved information with the sender's home gateway ID information stored in database 212.

Database 212 maintains a record of the mapping between the sender's personal ID (identification) and the sender's home gateway ID.

SMS-XMPP (Extensible Messaging and Presence Protocol) bridge module 214 redirects the sender's message to the sender's home gateway 206 once the home gateway has been identified by SMS bridge server 210. If SMS gateway 204 is hosted in a cloud computing system (or "cloud"), the use of this SMS-XMPP bridge enables secure communication from the cloud to the home gateway 206. The home gateway can 206 now be protected from virus attacks from external network using any firewall software. Another advantage of the bridge is to enable asynchronous and always live communication between the cloud and the home gateway which is important for instant messaging.

Home gateway 206 is coupled to SMS gateway 204. Once SMS gateway 204 identifies the home gateway of a sender from its records, it forwards the message to the senders home gateway 206. Home gateway 206 includes message routing service (MRS) module 216 and contact database 218.

Message routing service (MRS) module 216 extracts a receiver's details from a message received by home gateway 206. Receiver details may include a receiver's name, receiver's alias name, receiver's phone number, receiver's email ID, receiver's chat ID, and the like.

Message routing service (MRS) module 216 also obtains a receiver's message communication preference from contact database 218. Message communication preference of a receiver specifies a receiver's preferred message communication mode for receiving a message. Message communication mode may include an email client (if the receiver would like to receive the message via an email), a chat client (if the receiver's message receipt preference is via a chat message), an SMS service (if the receiver would like to receive an SMS message on his/her phone), and the like.

Message routing service (MRS) module 216 also obtains corresponding receiver ID from contact database 218 once a receiver's communication preference is known.

Once a receivers message communication preference and his/her corresponding receiver ID are known, message routing service (MRS) module 216 converts a received message to the preferred communication mode of a receiver and sends it to a message receiving unit of the receiver.

In the present example, message receiving unit 208 is a computer system, which is used by a receiver to receive and display a text message sent by a sender.

Figure 3:
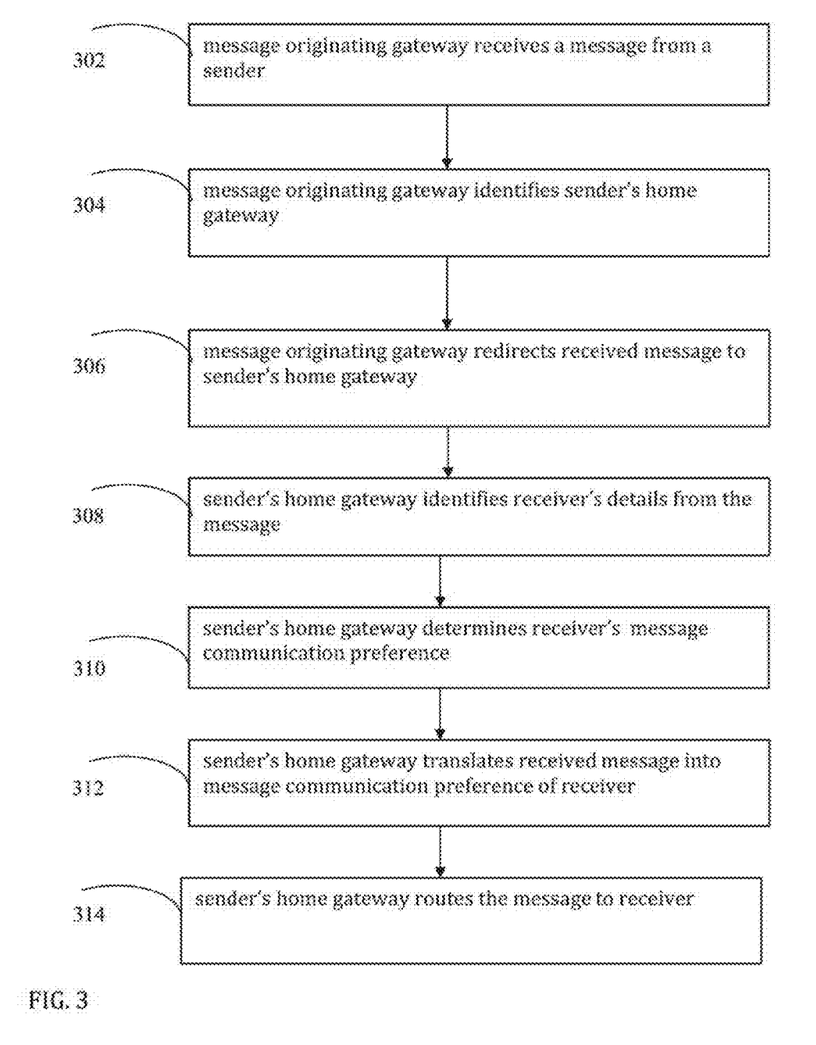
FIG. 3 shows a flowchart of a method of routing a message using a home gateway, according to an example.

FIG. 3 shows a flowchart of a method of routing a message using a home gateway, according to an example.

At block 302, a message originating gateway (i.e. a first message gateway) receives a message from a sender. The message may be a text message, multimedia message, chat message, an email message, or the like. The sender may send the message using his/her message originating unit. While sending the message, the sender is not required to remember or store multiple personal IDs of a receiver (such as his/her email ID, chat ID, mobile phone number, etc.) although these receiver details may be optionally saved on the sender's messaging unit at his/her discretion. In an implementation, an alias of a receiver is used to send a message. For instance, alias name "Archie" may be used in place of "Archie Thomas". In this case, only the alias names (such as "Archie") are stored in the sender's message originating unit and the sender simply uses the alias name of a receiver while composing and sending a message.

In another implementation, the sender may also specify his/her private home gateway ID details in the message. A sender's home gateway ID is a unique set of characters that identifies a home gateway device of the sender. For example, a message to a sender that includes a receiver's alias and the sender's home gateway ID may be in the format—"JACK 1206 #Archie: How are you?", wherein "JACK 1206" is the sender's home gateway ID, "Archie" is the alias name of the receiver "Archie Thomas", and "How are you?" is the message intended for the receiver. The aforesaid message format is for the purpose of illustration only and many other variations may be employed.

In an example, the message originating gateway is an SMS gateway and the message received from the sender is a text message.

At block 304, upon receipt of the message, a message bridge server, which is a component of the message originating gateway, identifies the sender's home gateway ID. The sender's home gateway is identified by retrieving the sender's personal ID information from the message sent by him/her, and then correlating the retrieved information with the sender's home gateway ID information stored in a database of the message originating gateway. In an implementation, the message bridge server is an SMS bridge server which identifies the sender's home gateway ID by retrieving the sender's mobile phone number from the text message. To provide an illustration, in the context of above mentioned example, an SMS bridge server may extract the sender's mobile number (let's say, 12345XXXX) from the message and then retrieve his home gateway device ID (JACK 1206) information from the database.

In case a sender has provided his/her private home gateway ID details in the message itself, the gateway information is extracted from therein.

At block 306, once a sender's home gateway has been identified, a message bridge module present in the message originating gateway redirects the received message to the sender's home gateway. In an implementation, message bridge module is an SMS-XMPP (Extensible Messaging and Presence Protocol) bridge module that redirects the sender's message to the sender's home gateway after the home gateway has been identified.

At block 308, a message routing service module (present in the sender's home gateway) extracts the receiver's details from the message received by the sender's home gateway. Receiver details may include a receiver's name, receiver's alias name (such as "Archie" for "Archie Thomas"), receiver's phone number, receiver's email ID, receiver's chat ID, and the like. In an implementation, if a receiver's phone number is present in the received message, message routing service module extracts the phone number of the receiver.

At block 310, once the receiver's details are known, the message routing service module obtains the receiver's message communication preference from a contact database present on the home gateway. Message communication preference of a receiver specifies a receiver's preferred message communication format and/or device for receiving a message. Once the receiver's communication preference is identified, the message routing service module obtains the receiver's corresponding ID information from contact database. For instance, if a receiver's preferred communication mode is email, message routing service module obtains the email ID of the receiver (for example archie@xyz.com). In another instance, if a receiver prefers to receive his/her messages as chat messages, the chat ID of the receiver is obtained from contact database.

In an implementation, the message routing service module also checks the preferred message receiving device of the receiver from the contact database. For example, if a sender has sent an SMS message to a mobile device of a receiver, but the preferred communication device of the receiver is a tablet device, message routing service module directs the received message to the tablet device of the receiver.

In an implementation, the sender and the receiver of a message belong to a pre-defined group of users of the home gateway. The group details (such as their personal IDs and message communication preferences) are stored in the home gateway device.

At block 312, once a receiver's message communication preference and his/her corresponding receiver ID are known, message routing service module converts or translates the received message into the message communication preference (preferred communication format and/or device) of the receiver. For example, if a sender has sent an SMS message, but the preferred message communication format of the receiver is email, message routing service module translates the received message into an email. In another example, if a sender has sent a chat message, but the preferred communication format of the receiver is SMS, message routing service module converts the received message into an SMS. In a yet another example, if a sender has sent an SMS message to a mobile device of a receiver, but the preferred communication device of the receiver is a tablet device, message routing service module routes the received message to the preferred device in this case, tablet device) of the receiver. Translating a message into the message communication preference of a receives includes converting an initial message protocol into a preferred message protocol of the receiver.

At block 314, message routing service module routes the message to the receiving unit of the receiver.

In an implementation, message routing service module routes the message to a display device of a receiver. For instance, this could happen in a scenario where an intended receiver is not using a personal device (such as an elderly individual at home). The display device may be a remote display which could be connected to the home gateway through wire or wireless communication links. For example, the display device may be a television set in a living room of a receiver.

In another implementation, messaging routing service module could interpret the message locally in a home gateway and execute an action on connected and accessible devices or available applications. For example, if the message is addressed to an alias name "fridge", then the message can be interpreted as an action control on the fridge. Similarly, if the message is addressed to an alias name "PC", then the rest of the message can be interpreted as an application execution command on the personal computer (named "PC"), which may be connected (through wire or wireless communication links) to the home gateway.

The mapping between a destination address (alias name) and a device as well as list of commands that the device accepts can be specified in an XML file (or database). Addition of new commands and devices can be done via an admin console of the home gateway. This reconfiguration can be done by sending a system message for configuration as well.

Figure 4:
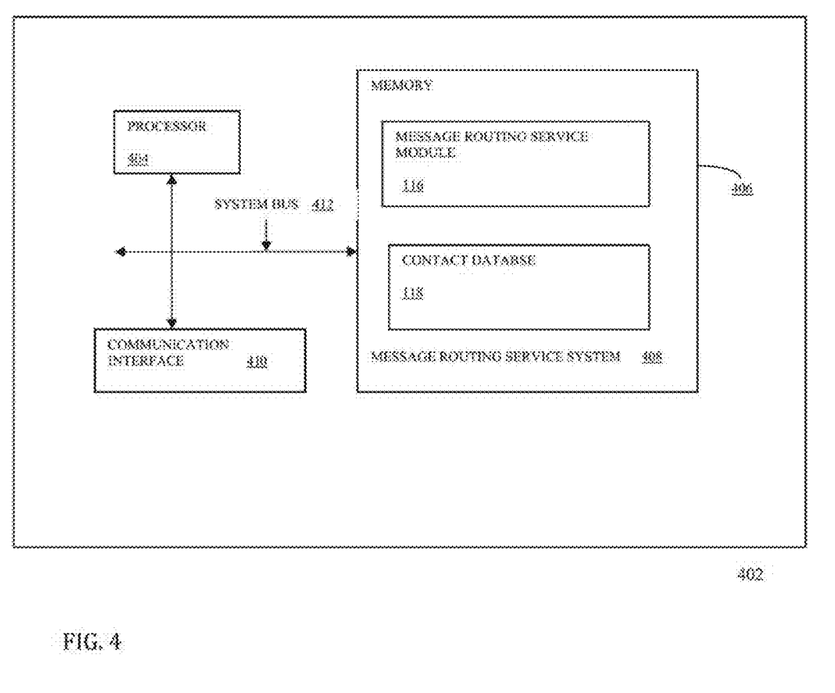
FIG. 4 shows a block diagram of a message routing system hosted on is computer system, according to an example.

FIG. 4 shows a block diagram of a message routing system hosted on a computer system, according to an example.

Computer system 402 may be a desktop computer, notebook computer, tablet computer, computer server mobile phone, personal digital assistant (PDA), network switch, router, or the like.

Computer system 402 may include processor 404, memory 406, message routing system 408 and a communication interface 410. Message routing system 408 includes a message routing service module 116 and contact database 118. The components of the computing system 402 may be coupled together through a system bus 412.

Processor 404 may include any type of processor, microprocessor, or processing logic that interprets and executes instructions.

Memory 406 may include a random access memory (RAM) or another type of dynamic storage device that may store information and instructions non-transitorily for execution by processor 404. For example, memory 406 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 406 may include instructions that when executed by processor 404 implement message routing system 408.

Communication interface 410 may include any transceiver-like mechanism that enables computing device 402 to communicate with other devices and/or systems via a communication link. Communication interface 410 may be a software program, a hard ware, a firmware, or any combination thereof. Communication interface 410 may use a variety of communication technologies to enable communication between computer system 402 and another computer system or device. To provide a few non-limiting examples, communication interface 410 may be an Ethernet card, a modem, an integrated services digital network ("ISDN") card, etc.

Message routing system 408 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

In an implementation, message routing system 408 may be read into memory 406 from another computer-readable medium, such as data storage device, or from another device via communication interface 410.

The proposed solution is client agnostic—sender and receiver do not need to use the same set of clients. Additionally, it allows a sender to address a recipient by name rather than another handle. The communication channel is abstracted away from both the sender and recipient, and the recipient name is resolved by the gateway to the appropriate messaging mechanism. Furthermore, a user can specify how he or she would like to be contacted. For example, before going on an international trip, a user can specify that he does not want to receive messages at all, or via SMS rather than email. The gateway can also act as an "answering machine" and store messages when the user is not reachable or does not wish to be reached.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of as computer system.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method comprising:
   receiving a message from a sender at a message originating gateway comprising a processor;
   identifying, by the message originating gateway, a home gateway of the sender based on a sender identifier of the sender and a time of day associated with the message, the identifying comprising retrieving an identifier of the identified home gateway from a database containing a plurality of records, each record of the plurality of records mapping a corresponding sender identifier and a corresponding time of day to a respective identifier of a home gateway, wherein the plurality of records contain identifiers of different home gateways, wherein the plurality of records comprise:
   a first record containing information mapping the sender identifier of the sender and a first time of day to an identifier of a first home gateway, and
   a second record containing information mapping the sender identifier of the sender and a second time of day to an identifier of a second home gateway,
   wherein the identifier of the identified home gateway is retrieved based on selecting from the first and second records based on the time of day associated with the message;
   routing the message from the message originating gateway to the identified home gateway to translate the message into a preferred message communication format of a receiver and to route the translated message to the receiver.

2. The method of claim 1, wherein the sender and the receiver belong to a pre-defined group of users of the identified home gateway.

3. The method of claim 1, wherein the message includes an alias name of the receiver to which the message is targeted, the method further comprising identifying the receiver of the message using the alias name.

4. The method of claim 3, further comprising:
   accessing, by the identified home gateway, a contact database using the alias name to determine a message communication preference of the receiver of the message; and
   accessing, by the identified home gateway from the contact database, a receiver identifier that corresponds to the message communication preference.

5. The method of claim 1, wherein translating the message into the preferred message communication format of the receiver includes converting an initial message protocol into a preferred message protocol of the receiver.

6. The method of claim 1, comprising:
   identifying another home gateway of the sender at the message originating gateway based on another time of the day.

7. The method of claim 1, wherein the identifying comprises using the sender identifier of the sender and the time of day associated with the message to retrieve a record of the plurality of records.

8. The method of claim 7, wherein the retrieved record is selected from one of the first and second records based on the time of day associated with the message.

9. The method of claim 1, wherein the different home gateways are private gateways of respective different senders.

10. The method of claim 1, further comprising:
    determining, by the identified home gateway, a message communication preference of the receiver of the message, wherein the message communication preference of the receiver includes the preferred message communication format of a plurality of message communication formats;
    translating, by the identified home gateway, the message into the preferred message communication format of the receiver; and
    routing, by the identified home gateway, the translated message to the receiver.

11. The method of claim 10, wherein the message communication preference of the receiver includes a preferred communication device for receiving the message, and wherein routing the translated message to the receiver comprises routing the translated message to the preferred communication device.

12. A message routing system, comprising:
a first message gateway comprising a processor and a non-transitory medium storing instructions executable on the processor to:
receive a message from a sender,
responsive to a sender identifier of the sender and a time of day associated with the message, retrieve a record from a plurality of records, each record of the plurality of records mapping a corresponding sender identifier and a corresponding time of day to a respective identifier of a home gateway, wherein the plurality of records contain respective identifiers of corresponding different home gateways, and the plurality of records comprise:
a first record containing information mapping the sender identifier of the sender and a first time of day to an identifier of a first home gateway, and
a second record containing information mapping the sender identifier of the sender and a second time of day to an identifier of a second home gateway,
wherein the retrieved record is selected from the first and second records based on the time of day associated with the message,
identify a home gateway of the sender from the retrieved record, and
send the message to the identified home gateway of the sender to translate the message into a preferred message communication format of a receiver and to route the translated message to the receiver.

13. The message routing system of claim 12, wherein the preferred message communication format of the receiver is stored in the home gateway of the sender identified based on the sender identifier of the sender and the time of day associated with the message.

14. The message routing system of claim 12, wherein the first message gateway is hosted in a cloud computing system.

15. The message routing system of claim 12, wherein the first message gateway is a Short Message Service (SMS) gateway.

16. The message routing system of claim 12, wherein the message is one of a Short Message Service (SMS) message, a chat message, and an email message.

17. A non-transitory computer readable medium storing machine executable instructions that when executed by a computer system cause the computer system to:
receive a message from a sender, wherein the message includes a sender identifier of the sender;
responsive to the sender identifier and a time of day associated with the message, retrieve a record from a plurality records in a database, each record of the plurality of records mapping a corresponding sender identifier and a corresponding time of day to a respective identifier of a home gateway, wherein the plurality of records contain identifiers of different home gateways, wherein the plurality of records comprise:
a first record containing information mapping the sender identifier of the sender and a first time of day to an identifier of a first home gateway, and
a second record containing information mapping the sender identifier of the sender and a second time of day to an identifier of a second home gateway,
wherein the retrieved record is selected from the first and second records based on the time of day associated with the message;
identify a home gateway of the different home gateways based on the retrieved record; and
send the message to the identified home gateway to translate the message to a format according to a message communication preference of a receiver and to route the translated message to the receiver.

18. The non-transitory computer readable medium of claim 17, wherein the machine executable instructions when executed cause the computer system to:
determine, by the identified home gateway, the message communication preference of the receiver of the message;
translate, by the identified home gateway, the message into the format according to the message communication preference; and
route, by the identified home gateway, the translated message to the receiver.

* * * * *